United States Patent [19]

Manchester

[11] 4,004,365
[45] Jan. 25, 1977

[54] SIGNALING FISHING ROD HOLDER

[76] Inventor: Lester F. Manchester, P.O. Box 1857, Clearlake Highlands, Calif. 95422

[22] Filed: July 22, 1975

[21] Appl. No.: 597,988

[52] U.S. Cl. .................................................. 43/17
[51] Int. Cl.² ........................................ A01K 97/12
[58] Field of Search ...................... 43/17, 21.2, 16

[56] References Cited

UNITED STATES PATENTS

| 2,899,769 | 8/1959 | Niles | 43/21.2 |
|---|---|---|---|
| 2,908,099 | 10/1959 | Burke | 43/16 |
| 3,672,085 | 6/1972 | King | 43/21.2 |
| 3,783,548 | 1/1974 | Fisher | 43/21.2 |
| 3,862,508 | 1/1975 | Morgan | 43/21.2 |

Primary Examiner—Warner H. Camp
Attorney, Agent, or Firm—Blair & Brown

[57] ABSTRACT

A signaling fishing rod holder is provided with a clamp which can be used in one position to clamp the fishing rod holder to the horizontal planks of a pier and in another position to clamp the fishing rod holder to the vertical planking along the side of a boat. A clamp is adapted to cooperate with a ground inserted spike to mount the fishing rod holder on the bank of a body of water.

The fishing rod holder includes a frame member secured tightly to the clamp and having an arm pivotally mounted thereon. An adjustable spring normally urges one end of the arm upwardly away from a switch mounted on the frame. An arcuate fishing pole holder is mounted on the arm and can be adjusted by means of an elongate slot and wing nut so as to adjust the angle of the fishing pole held therein without changing the relationship between the arm and the frame. A battery operated horn or beeper is secured to the frame member and electrically connected to the switch so as to produce a loud noise whenever the arm is depressed into contact with the switch due to a fish pulling on the line attached to the fishing rod.

5 Claims, 9 Drawing Figures

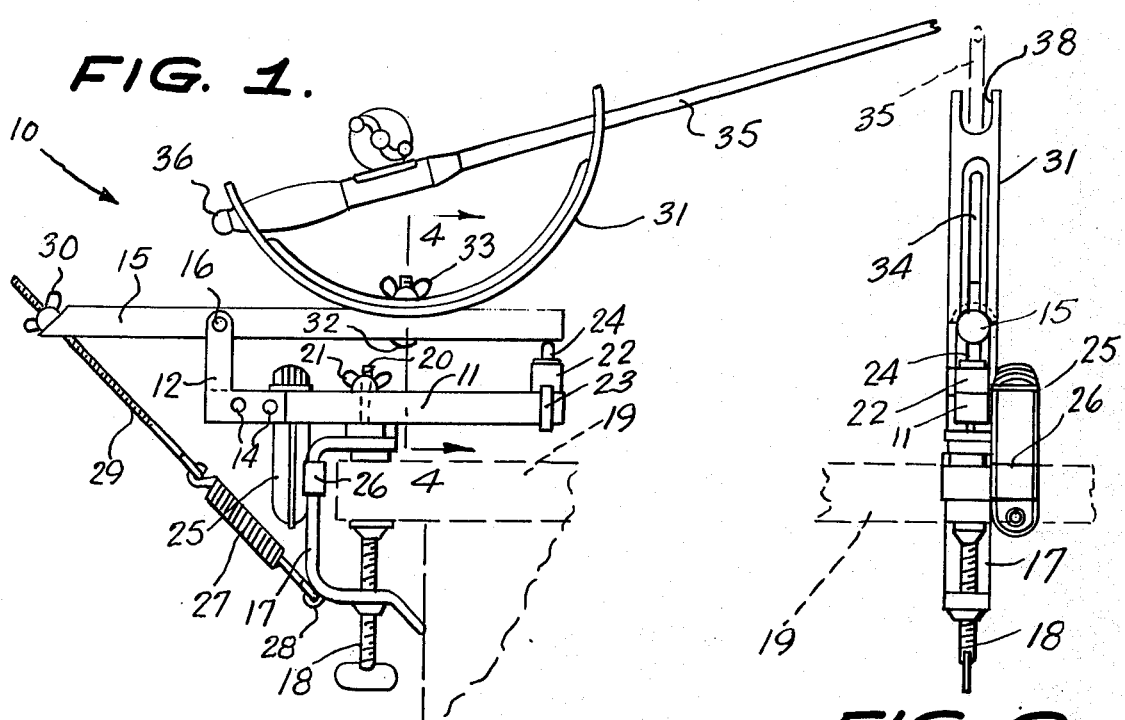
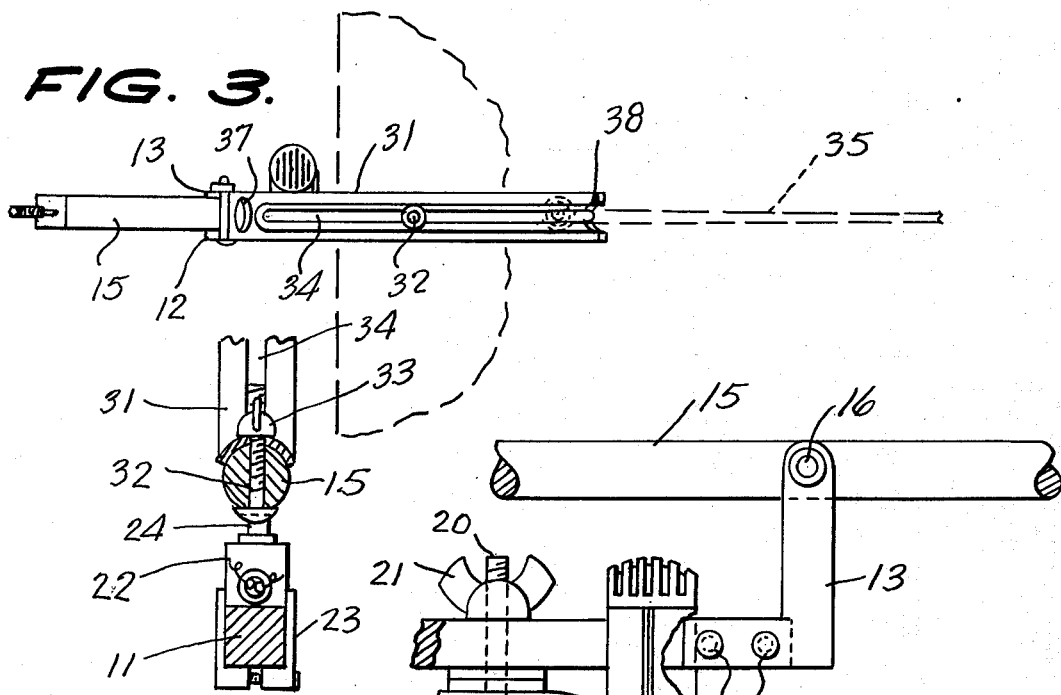
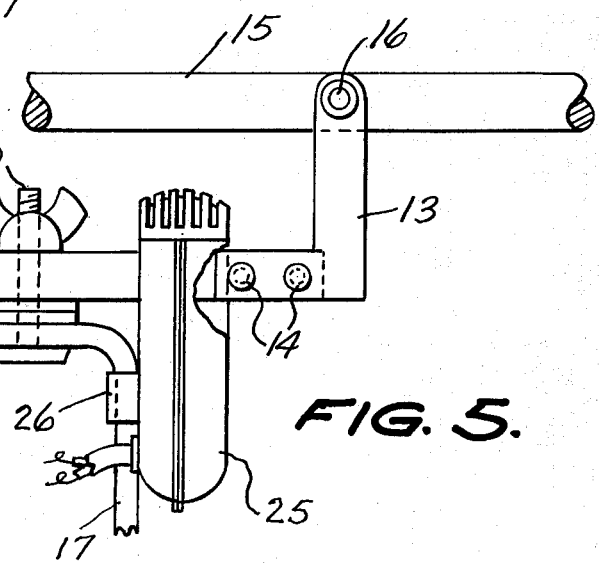

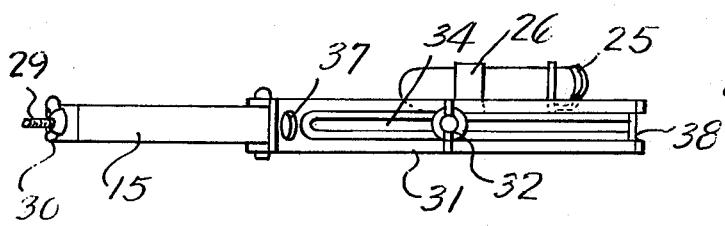
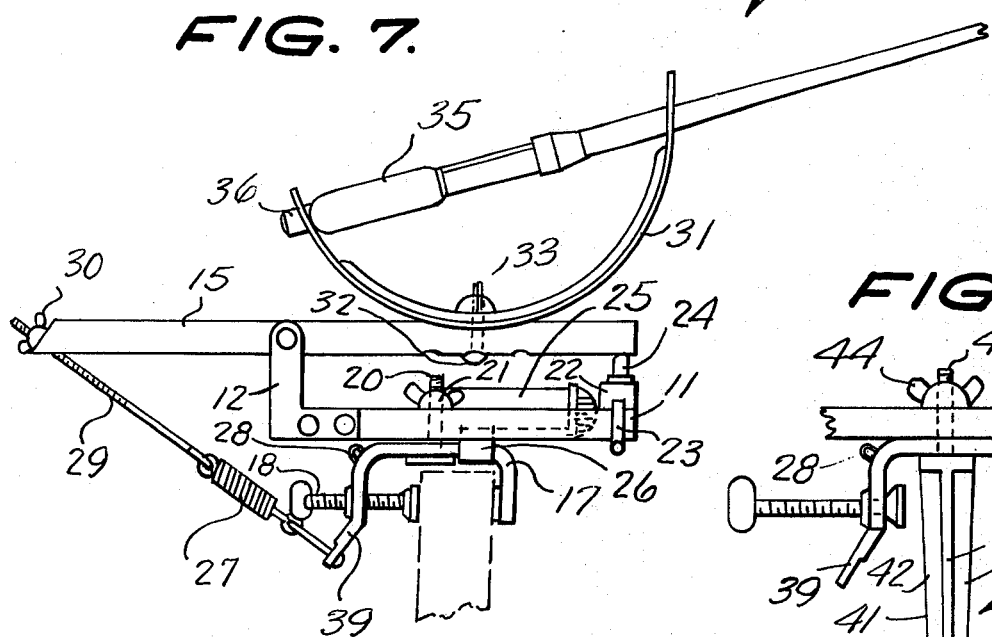
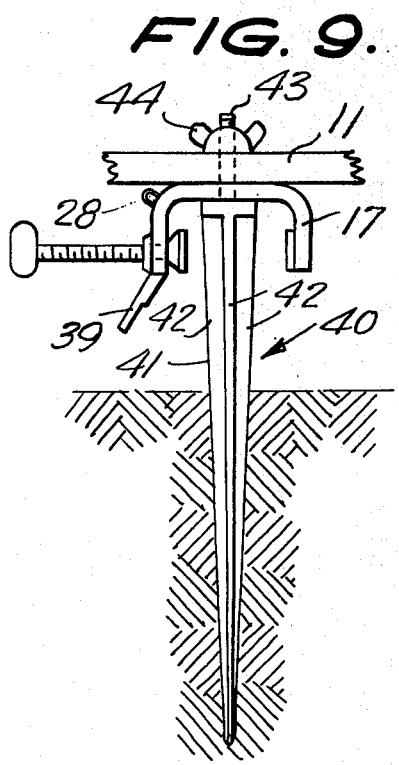
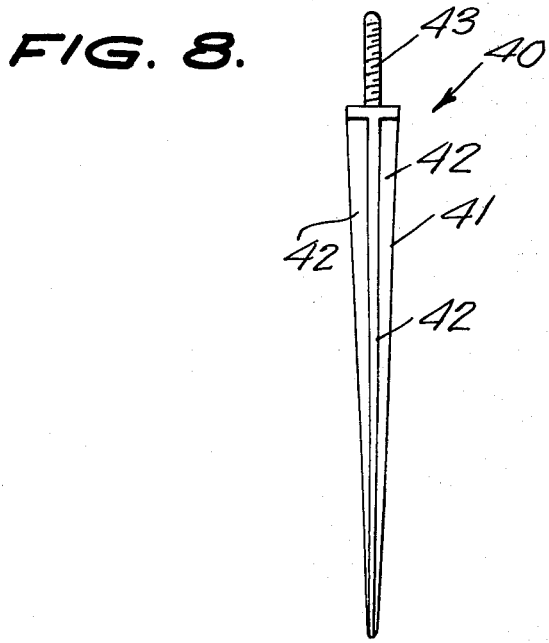

SIGNALING FISHING ROD HOLDER

BACKGROUND OF THE INVENTION

Field of the Invention

The present invention relates to signaling fishing rod holders which produce an audible signal when a fish pulls on the fishing line.

The primary object of the present invention is to provide an easily adjustable fishing rod holder which can be attached to horizontal planks, vertical planks and ground spikes.

Other objects and advantages will become apparent in the following specification when considered in light of the attached drawings.

BRIEF DESCRIPTION OF THE DRAWINGS

FIG. 1 is a side elevation of the invention with the fishing rod shown partially broken away;

FIG. 2 is an end elevation of the invention;

FIG. 3 is a top plan view of the invention;

FIG. 4 is an enlarged fragmentary vertical sectional view taken along the line 4—4 of FIG. 1 looking in the direction of the arrows;

FIG. 5 is an enlarged fragmentary side elevational view of the structure illustrated in FIG. 1 from the opposite side thereof;

FIG. 6 is a top plan view of the invention shown in boat clamping configuration;

FIG. 7 is a view similar to FIG. 1 of the configuration illustrated in FIG. 6;

FIG. 8 is a side elevation of a ground spike having a threaded projection on the upper end thereof; and FIG. 9 is a view similar to FIG. 8 with the ground spike secured to the clamp and frame of the fishing rod holder.

DESCRIPTION OF THE PREFERRED EMBODIMENT

Referring now to the drawings in detail wherein like reference characters indicate like parts throughout the several figures the reference numeral 10 indicates generally a fishing rod holder constructed in accordance with the invention.

The fishing rod holder 10 includes a generally horizontal frame 11 having a pair of right angularly extending arms 12,13 secured on opposite sides of one end thereof by bolts 14.

A generally horizontal arm 15 is positioned generally parallel to the frame 11 and extends between the right angle arms 12,13 and is pivotally secured thereto by means of a pivot 16 extending transversely thereof.

A generally U-shaped clamp 17 is provided with a clamping thumb screw 18 to clamp a horizontal board 19 in the U-shaped clamp 17. A bolt 20 extends through the side of the clamp 17 opposite the wing bolt 18 in axial alignment therewith. The bolt 20 extends through the frame 11 and is secured thereto by a wing nut 21. A switch 22 is secured to the frame 11 by a clamp 23 and has a switch button 24 which is positioned to be contacted by the arm 15 as it swings downwardly toward the frame 11.

A horn 25 is secured to the clamp 17 by a clamp 26 and is electrically connected to the switch 22. The horn 25 has self-contained batteries and is actuated when the button 24 of the switch 22 is depressed by the movement of the arm 15.

A tension spring 27 is secured to an eye 28 on the U-shaped clamp 17 at one end, and to an eye bolt 29 on the opposite end which is adjustably secured to one end of the arm 15 by a wing nut 30. Sufficient tension is maintained on the spring 27 to prevent the arm 15 from depressing the button 24 under normal conditions.

An arcuate fishing rod holder 31 is secured to the arm 15 by a bolt 32 and wing nut 33. The bolt 32 extends through an elongate slot 34 in the fishing rod holder 31 so that the holder 31 can be adjusted there along to angularly adjust the fishing rod 35 supported therein. The fishing rod 35 has the handle end 36 thereof extending into a bore 37 formed in one end of the fishing rod holder 31. The opposite end of the fishing rod holder 31 is provided with a notch 38 to support the fishing rod 35.

In the configuration of the invention shown in FIGS. 6 and 7 the horn 25 is mounted on clamp 17 by means of clamp 26 and the U-shaped clamp 17 is secured to the frame 11 by the bolt 20 and wing nut 21 with the thumb bolt 18 in a generally horizontal position. The U-shaped clamp 17 has an angular extension 39 to which the spring 27 is attached in this configuration of the invention.

FIGS. 8 and 9 illustrate an attachment for use with the invention for supporting the fishing rod holder along the bank of a body of water. In FIG. 8 a spike is indicated generally at 40 and includes a tapered lower portion 41 having a plurality of wings 42 tapering downwardly to a substantial point. A threaded shaft 43 extends upwardly from the lower portion 41 and it is adapted to project through the U-shaped clamp 17 and frame 11 to be secured thereto by a wing nut 44.

In the use and operation of the invention the fishing rod holder 31 is adjusted to the desired angle and the wing nut 33 is tightened to hold it at the predetermined angle. With the fishing pole 35 in place in the holder 31 the wing nut 30 is adjusted to establish sufficient tension through the spring 27 on the arm 15 so that the arm 15 barely contacts the button 24 without causing it to be depressed. With the fishing line provided with proper hooks and bait and cast into the water the fishing pole 35 is dropped in to the holder 31 and the fisherman waits for a fish to strike the bait to thus cause the rod 35 to be depressed along with the rod 15 moving the button 24 downwardly and operating the signal 25. The fisherman can then extract the fish pole 35 from the holder 31 with a simple hand motion where upon he can play the fish in the normal manner.

Having thus described the preferred embodiment of the invention it should be understood that numerous structural modifications and adaptations may be resorted to without departing from the spirit of the invention.

What is claimed is:

1. A fishing rod holder comprising a frame, a rod spaced above said frame in generally parallel relation thereto and pivotally secured to said frame on a transverse pivot, a generally U-shaped clamp secured to said frame in depending relation thereto, a generally arcuate bracket with a fishing rod positioned across the ends of the bracket mounted on said rod with a bolt and having an elongate slot therein to permit angular adjustment of said bracket on said rod and therefore the fishing rod, a signal switch mounted on said frame and positioned to underlie said rod, a battery actuated signal secured to said frame and electrically connected to said switch for actuating said signal upon downward movement of said rod and its attached fishing rod, and resilient means extending from said U-shaped clamp to the end of said rod opposite said switch for normally biasing said rod away from said switch to prevent actuation of said switch prior to a catch being made with said fishing rod.

2. The device as claimed in claim 1 including means on said U-shaped clamp for mounting said U-shaped clamp alternately for engagement with a horizontal plank or a vertical plank.

3. The device as claimed in claim 1 wherein the means on said arcuate bracket for supporting said fishing rod includes a bore for receiving the handle end of the fishing rod and oppositely thereof a U-shaped notch to receive a rod portion of the fishing rod.

4. A device as claimed in claim 1 including a ground engaging spike having means for securing said spike to said U-shaped clamp on said frame.

5. A device as claimed in claim 4 wherein the means for securing said spike to said U-shaped clamp includes a threaded shaft for extending upwardly from said spike and projecting through said U-shaped clamp and said frame and secured thereto by a wing nut.

* * * * *